(12) United States Patent
Suzuki (10) Patent No.: US 8,525,886 B2
(45) Date of Patent: Sep. 3, 2013

(54) IMAGE PROCESSING APPARATUS AND IMAGE PROCESSING METHOD

(75) Inventor: Hiroyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 12/205,981

(22) Filed: Sep. 8, 2008

(65) Prior Publication Data

US 2009/0091637 A1   Apr. 9, 2009

(30) Foreign Application Priority Data

Oct. 3, 2007   (JP) .................................. 2007-260300

(51) Int. Cl.
*H04N 5/225* (2011.12)
*H04N 5/445* (2011.01)

(52) U.S. Cl.
USPC ...................................... 348/207.1; 348/563

(58) Field of Classification Search
USPC ................. 348/563, 333.01, 222.1; 725/135, 725/37, 131
See application file for complete search history.

(56) References Cited

U.S. PATENT DOCUMENTS

| | | | |
|---|---|---|---|
| 2004/0109063 A1* | 6/2004 | Kusaka et al. | 348/207.1 |
| 2004/0141084 A1* | 7/2004 | Kurakata | 348/333.01 |
| 2006/0055825 A1* | 3/2006 | Shiota et al. | 348/563 |
| 2006/0150235 A1* | 7/2006 | Hsieh et al. | 725/135 |
| 2006/0190618 A1* | 8/2006 | Tomita | 709/231 |
| 2007/0237397 A1* | 10/2007 | Johnson et al. | 382/209 |
| 2008/0222655 A1* | 9/2008 | Sato | 719/318 |

FOREIGN PATENT DOCUMENTS

| | | |
|---|---|---|
| CN | 1798045 A | 7/2006 |
| EP | 1 777 706 A1 | 4/2007 |
| JP | 2002-354309 * | 6/2002 |
| JP | 2006-59331 | 3/2006 |
| JP | 2006-166408 | 6/2006 |
| JP | 2006-254098 | 9/2006 |

* cited by examiner

*Primary Examiner* — Roberto Velez
*Assistant Examiner* — Stephen Coleman
(74) *Attorney, Agent, or Firm* — Oblon, Spivak, McClelland, Maier & Neustadt, L.L.P.

(57) ABSTRACT

An image processing apparatus for achieving the exchange of pieces of image data between a plurality of image processing apparatuses includes: a feature value extraction unit for extracting a feature value included in image data; a feature value transfer unit for transferring to another image processing apparatus a feature value extracted from image data to be exchanged; a feature value reception unit for receiving a feature value transferred from the other image processing apparatus; a first determination unit for determining whether the received feature value matches a feature value included in image data of a captured image; an image data transfer unit for transferring the image data of the captured image to the other image processing apparatus when there is a match between the feature values; and an image data reception unit for receiving image data of a captured image transferred from the other image processing apparatus.

14 Claims, 9 Drawing Sheets

IMAGE PROCESSING APPARATUS AND IMAGE PROCESSING METHOD

CROSS REFERENCES TO RELATED APPLICATIONS

The present invention contains subject matter related to Japanese Patent Application JP 2007-260300 filed in the Japanese Patent Office on Oct. 3, 2007, the entire contents of which are incorporated herein by reference.

BACKGROUND OF THE INVENTION

1. Field of the Invention

The present invention relates to an image processing apparatus and an image processing method.

2. Description of the Related Art

In recent years, a technique for exchanging pieces of image data of images captured by a plurality of image pickup apparatuses such as digital cameras or video cameras among these image pickup apparatuses has been developed. In such an exchange of pieces of image data, image data is transferred from one image pickup apparatus to another image pickup apparatus via a wire/wireless communication link with or without a server.

Japanese Unexamined Patent Application Publication No. 2006-59331 discloses an image data exchange method. In this method, each camera user registers identification information in a server in advance. When the server receives image data and identification information which have been uploaded thereto, it distributes the image data to a user corresponding to the identification information. Accordingly, this method is used in a case in which a plurality of cameras included in an image capturing group register common identification information so as to share image data.

Japanese Unexamined Patent Application Publication No. 2006-254098 discloses an image data exchange method. In this method, a plurality of camera users set common identification information in advance. The users cause cameras owned by the users to automatically store obtained image data along with the identification information. Upon receiving a request including the identification information from one of cameras sharing the identification information, another camera reads out stored image data associated with the identification information, and transmits the image data to the camera. At that time, the connection between these cameras is established by the users of the cameras.

SUMMARY OF THE INVENTION

In some cases, a user may want to obtain image data of an image including a specific subject, for example, a photographer, using an image data exchange method.

In the method disclosed in Japanese Unexamined Patent Application Publication No. 2006-59331, however, the checking of subject image data included in image data is not performed. One of cameras included in an image capturing group transmits (uploads) pieces of image data of all images captured by the camera to a server. Another camera receives the pieces of image data of all the images from the server and stores them. In order to obtain image data including data of a specific subject, the user of the camera has to check all the pieces of image data received one by one so as to determine whether the data of the specific subject is included, and delete unnecessary pieces of image data.

In the method disclosed in Japanese Unexamined Patent Application Publication No. 2006-254098, it is necessary for each user to set identification information. Accordingly, in order to obtain image data including data of a specific subject, each user has to determine whether image data is to be exchanged each time image capturing is performed and set identification information in accordance with the determination result. Thus, each user has to perform a complicated operation. If the number of pieces of setting identification information is limited, it is difficult to specify image data including data of a desired subject. In this method, before transferring image data to be exchanged, a user has to perform a connection establishment operation for specifying a camera to which the image data is to be transferred. Accordingly, if image data is transferred to an indefinite number of cameras, a user has to perform a complicated connection establishment operation. Furthermore, since image data stored in advance is transferred, it is difficult to transfer image data at the time of image capturing. A user has to perform a transfer operation separately from image capturing.

Thus, in the case of image data exchange methods in the related art, user operations including mutual authentication for establishing the connection between a server and a camera or between cameras are performed. Furthermore, all or parts of pieces of stored image data are transferred without performing checking of subject image data included in the pieces of image data. Accordingly, a user checks a plurality of pieces of transferred image data one by one so as to determine whether desired subject image data is included and then deletes unnecessary pieces of image data. Alternatively, a user determines whether obtained image data is desired image data each time image capturing is performed, and then performs a connection establishment operation.

The checking of image data, the connection establishment operation, or the deletion of image data is an operational burden imposed on a user. This may reduce the efficiency of image capturing. Furthermore, by performing inefficient user's operations such as the connection establishment operation performed each time image data is transferred and the transfer and deletion of unnecessary image data, electric power for the operation of a camera is wasted. As a result, it is difficult to obtain sufficient electric power at the time of image capturing. Accordingly, the efficiency of image capturing may be further reduced.

It is desirable to provide an image processing apparatus and an image processing method capable of achieving the efficient exchange of pieces of image data between a plurality of image processing apparatuses.

According to a first embodiment of the present invention, there is provided an image processing apparatus for achieving the exchange of pieces of image data between a plurality of image processing apparatuses. The image processing apparatus includes: a feature value extraction unit configured to extract a feature value included in image data; a feature value transfer unit configured to transfer to another image processing apparatus a feature value extracted from image data to be exchanged; a feature value reception unit configured to receive a feature value transferred from the other image processing apparatus; a first determination unit configured to determine whether the received feature value matches a feature value included in image data of a captured image; an image data transfer unit configured to transfer the image data of the captured image to the other image processing apparatus when there is a match between the feature values; and an image data reception unit configured to receive image data of a captured image transferred from the other image processing apparatus.

In the image processing apparatus having the above-described configuration, a feature value included in image data is extracted, and a feature value extracted from image data to be exchanged is transferred to another image processing apparatus. A feature value transferred from the other image processing apparatus is received, a feature value included in image data is extracted, and it is determined whether the received feature value matches the feature value included in the image data. If there is a match between the feature values, the image data is transferred to the other image processing apparatus. Furthermore, image data transferred from the other image processing apparatus is received. Thus, on the basis of the feature value included the image data to be exchanged, corresponding image data is transferred to/from the other image processing apparatus. Accordingly, a plurality of image processing apparatuses can efficiently exchange pieces of image data to be exchanged.

The feature value transfer unit may transfer identification information allowing identification of the image processing apparatus from which the feature value extracted from image data to be exchanged is to be transferred along with the extracted feature value. The feature value reception unit may receive identification information of the other image processing apparatus from which the feature value has been transferred along with the transferred feature value. When the first determination unit determines that there is a match between the feature values, the image data transfer unit may transfer to the other image processing apparatus the identification information of the other image processing apparatus from which the feature value has been transferred and then been received along with the image data of the captured image. The image data reception unit may receive from the other image processing apparatus the identification of the image processing apparatus from which the feature value included in the image data of the captured image has been transferred along with the image data of the captured image. The image processing apparatus may further include a second determination unit configured to determine whether the identification information received from the other image processing apparatus matches identification information of the image processing apparatus that has received the identification information from the other image processing apparatus. Thus, the feature value extracted from the image data to be exchanged and the identification information allowing identification of the image processing apparatus from which the extracted feature value is to be transferred are transferred to the other image processing apparatus. The feature value and the identification information of the other image processing apparatus from which the feature value has been transferred are received from the other image processing apparatus. It is determined whether the received identification information matches identification information of the image processing apparatus that has received the identification information from the other image processing apparatus. As a result, corresponding image data and the identification information of an image processing apparatus that wants to obtain the image data are transferred to/from the other image processing apparatus. Accordingly, a plurality of image processing apparatuses can efficiently exchange pieces of image data to be exchanged on the basis of the determination result of identification information.

The image processing apparatus may further include an image data storage unit configured to store the received image data of the captured image. As a result, since the received image data is stored, image data to be exchanged can be easily stored.

The image processing apparatus may further include an image data storage unit configured to store the received image data of the captured image when the second determination unit determines that there is a match between the pieces of identification information. Thus, if there is a match between the pieces of identification information, the received image data is stored. Accordingly, image data to be exchanged can be easily stored on the basis of the determination result of identification information.

The image processing apparatus may further include a feature value storage unit configured to store a plurality of feature values received from the other image processing apparatus. The first determination unit may determine whether the feature value included in the image data of the captured image matches the stored feature values. The image data transfer unit may transfer to the other image processing apparatus the image data of the captured image when there is a match among the feature values. Thus, a plurality of feature values received from the other image processing apparatus are stored. It is determined whether the stored feature values match the feature value included in the image data. If there is a match among these feature values, the image data is transferred to the other image processing apparatus. As a result, since corresponding image data is transferred to/from the other image processing apparatus on the basis of the stored feature values, a plurality of image processing apparatuses can efficiently exchange pieces of image data to be exchanged.

The image processing apparatus may further include a feature value storage unit configured to store a plurality of feature values received from the other image processing apparatus and identification information of the other image processing apparatus from which the feature values have been transferred. The first determination unit may determine whether the feature value included in the image data of the captured image matches the stored feature values. When there is a match among the feature values, the image data transfer unit may transfer to the other image processing apparatus the identification information of the other image processing apparatus from which the feature values have been transferred along with the image data of the captured image. Thus, a plurality of feature values received from the other image processing apparatus and the identification information of the other image processing apparatus from which the feature values have been transferred are stored. It is determined whether the stored feature values match the feature value included in the image data. If there is a match among these feature values, the image data and the identification information of the other image processing apparatus from which the feature values have been transferred are transferred to the other image processing apparatus. As a result, since corresponding image data and the identification information of an image processing apparatus that wants to obtain the image data are transferred to/from the other image processing apparatus, a plurality of image processing apparatuses can efficiently exchange pieces of image data to be exchanged on the basis of the determination result of the stored feature values.

The feature value extraction unit may extract a feature value of a subject face image included in image data. The first determination unit may determine whether the extracted feature value of the subject face image matches a feature value of a subject face image received from the other image processing apparatus. Thus, the feature value of a subject face image is extracted, and it is determined whether the extracted feature value of the subject face image matches a feature value of a subject face image received from the other image processing apparatus. As a result, a plurality of image processing apparatuses can efficiently exchange corresponding pieces of image data on the basis of the feature value of a subject face image.

According to a second embodiment of the present invention, there is provided an image processing method of achieving the exchange of pieces of image data between a plurality of image processing apparatuses. The image processing method includes the steps of: receiving a feature value included image data to be exchanged from another image processing apparatus; extracting a feature value included in image data of a captured image; determining whether the extracted feature value matches the received feature value; and transferring the image data of the captured image to the other image processing apparatus when there is a match between the feature values.

In the above-described image processing method, first, an image processing apparatus receives a feature value included in image data to be exchanged from another image processing apparatus. The image processing apparatus extracts a feature value included in image data, determines whether the extracted feature value matches the received feature value, and transfers the image data to the other image processing apparatus when there is a match between the feature values. As a result, since corresponding image data is transferred to another image processing apparatus on the basis of a feature value included in image data to be exchanged, the other image processing apparatus can efficiently obtain desired image data.

In the receiving step, identification information allowing identification of the other image processing apparatus from which the feature value included in image data to be exchanged has been transferred may be received along with the feature value. In the transferring step, when it is determined in the determining step that there is a match between the feature values, the identification information of the other image processing apparatus from which the feature value has been transferred and then been received may be transferred to the other image processing apparatus along with the image data of the captured image. Thus, first, the image processing apparatus receives a feature value and identification information allowing identification of the other image processing apparatus from which the feature value has been transferred. If it is determined that there is a match between the received feature value and the extracted feature value, the image processing apparatus transfers to the other image processing apparatus image data and the identification information of the other image processing apparatus from which the feature value has been transferred and then been received. As a result, since corresponding image data and the identification information of an image processing apparatus that wants to obtain the image data are transferred to the other image processing apparatus, the other image processing apparatus can efficiently obtain the desired image data by determining whether the transferred image data is image data to be exchanged on the basis of the transferred identification information.

According to an embodiment of the present invention, there can be provided an image processing apparatus and an image processing method capable of achieving the exchange of pieces of image data between a plurality of image processing apparatuses.

DESCRIPTION OF THE PREFERRED EMBODIMENTS

Preferred embodiments of the present invention will be described in detail below with reference to the accompanying drawings. In the specification and the drawings, like reference numerals are used for like components and portions so as to avoid repeated explanation.

First Embodiment

An image data exchange method according to the first embodiment of the present invention will be described below.

Figure 1:
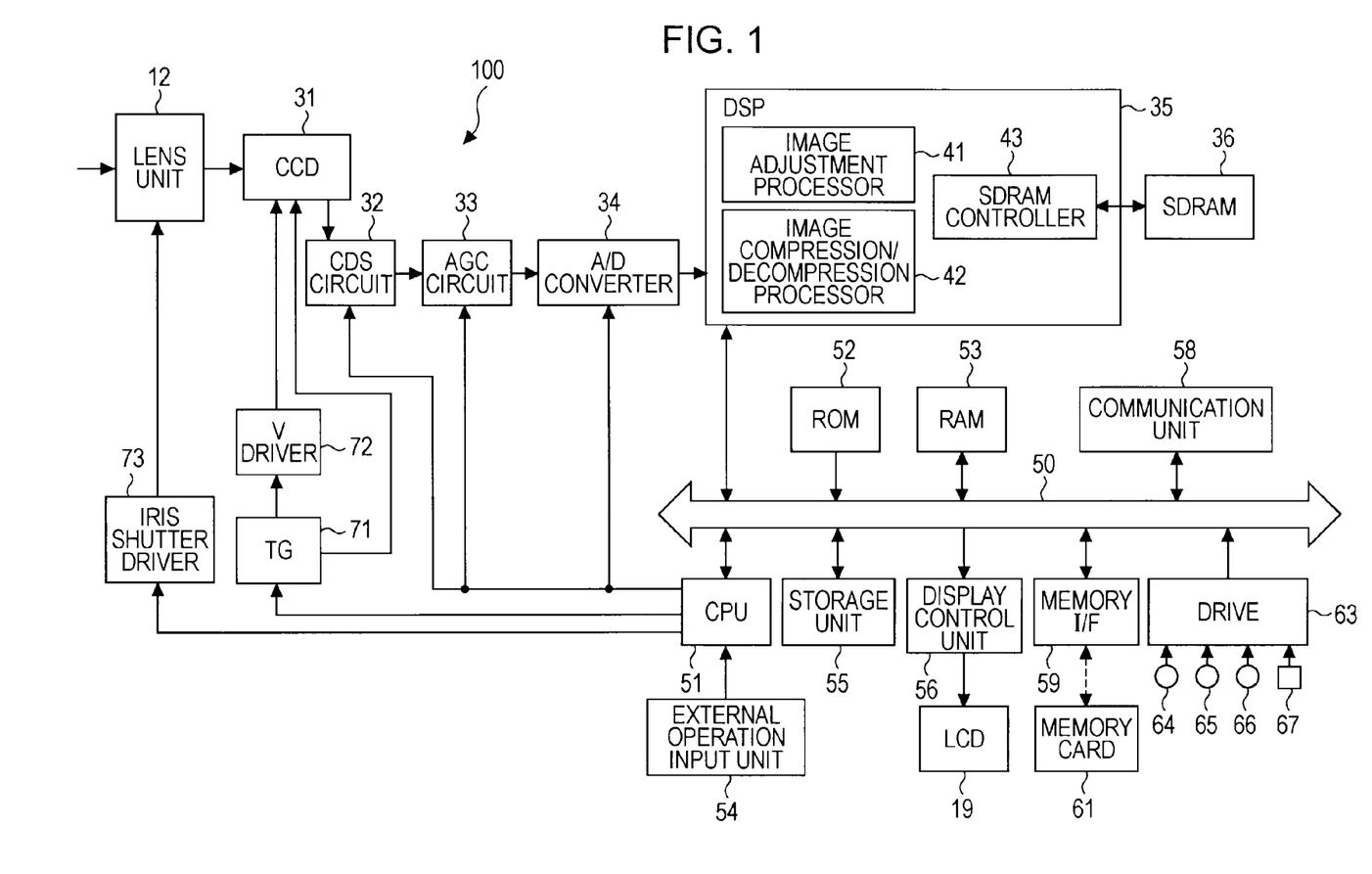
FIG. 1 is a block diagram illustrating an exemplary configuration of a digital camera having an image data exchange function.

FIG. 1 is a block diagram illustrating an exemplary configuration of a digital camera having an image data exchange function.

In a camera 100 illustrated in FIG. 1, light from a subject (not illustrated) is directed through a lens unit 12 having a lens and a diaphragm mechanism to a CCD 31 for photoelectric conversion and is then input into a CDS (Correlated Double Sampling) circuit 32 as a video signal.

The CDS circuit 32 performs correlated double sampling upon the input signal to remove noise and inputs the processed signal into an AGC circuit 33. The AGC circuit 33 adjusts the gain of the input signal and inputs the processed signal into an A/D converter 34. The A/D converter 34 converts the input signal (which is an analog signal) into a digital signal, and inputs the digital signal into a DSP 35.

The DSP 35 includes an image adjustment processor 41, an image compression/decompression processor 42, and an SDRAM controller 43. The DSP 35 causes the image adjustment processor 41 to generate control signals used for automatic focusing, automatic exposure, automatic white balance, etc. on the basis of the input signal, and supplies these control signals to a CPU 51 via a bus 50. The DSP 35 causes the image compression/decompression processor 42 to compress input image data using a predetermined compression/decompression method while causing the SDRAM controller 43 to control an SDRAM 36 so as to generate compressed image data. Furthermore, the DSP 35 causes the image compression/decompression processor 42 to decompress compressed image data that has been supplied to the storage unit 55.

The compressed image data generated by the image compression/decompression processor 42 is supplied to a RAM 53 via the bus 50 and is stored therein. Subsequently, the data is supplied to the storage unit 55 for recording in a memory or hard disk, a memory card 61 connected to a memory I/F 59 for recording, or a communication unit 58 for transfer to another apparatus.

The CPU 51 controls components or performs various pieces of processing in accordance with a program stored in a ROM 52 or a program loaded into the RAM 53 from the storage unit 55 including a flash memory. The RAM 53 also stores data that is necessary for the CPU 51 to perform various pieces of processing. The CPU 51 is connected to an external operation input unit 54 for receiving an operational signal input by a user.

The CPU 51, the ROM 52, and the RAM 53 are connected to one another via the bus 52. The bus 50 is also connected to the storage unit 55 including a non-volatile memory or a hard disk, a display control unit 56 for controlling an image to be displayed on an LCD 19, and the memory I/F 59 to which the memory card 61 is attached.

The display control unit 56 stores image data decompressed by the DSP 35 in a VRAM included therein, and causes the LCD 19 to display an image corresponding to the image data stored in the VRAM or an image corresponding to image data stored in another memory.

The bus 50 is connected to a drive 63 via an interface as appropriate so as to install a program read from a magnetic disk 64, an optical disc 65, a magneto-optical disk 66, or a memory 67 connected to the drive 63 into the storage unit 55 or the like. A program read from the memory card 61 that is attached to the memory I/F 59 as appropriate is also installed into the storage unit 55 if necessary.

The CPU 51 controls the operations of the CDS circuit 32, the AGC circuit 33, and the A/D converter 34 on the basis of control information input by a user with the external operation input unit 54, control information supplied from the image adjustment processor 41, or information obtained by executing various programs. Furthermore, the CPU 51 controls the operation of the CCD 31 by controlling a TG (Timing Generation unit) 71 for controlling the drive of the CCD 31 and a V driver 72. Still furthermore, the CPU 51 controls an iris shutter driver 73 for controlling the operation of the lens unit 12 so as to adjust a shutter speed or a diaphragm mechanism.

For example, under the control of the CPU 51, the communication unit 58 transmits or receives via a wire/wireless communication link various pieces of information including image data of a captured image to or from an image pickup apparatus such as another camera with which the camera 100 can communicate.

Figure 2:
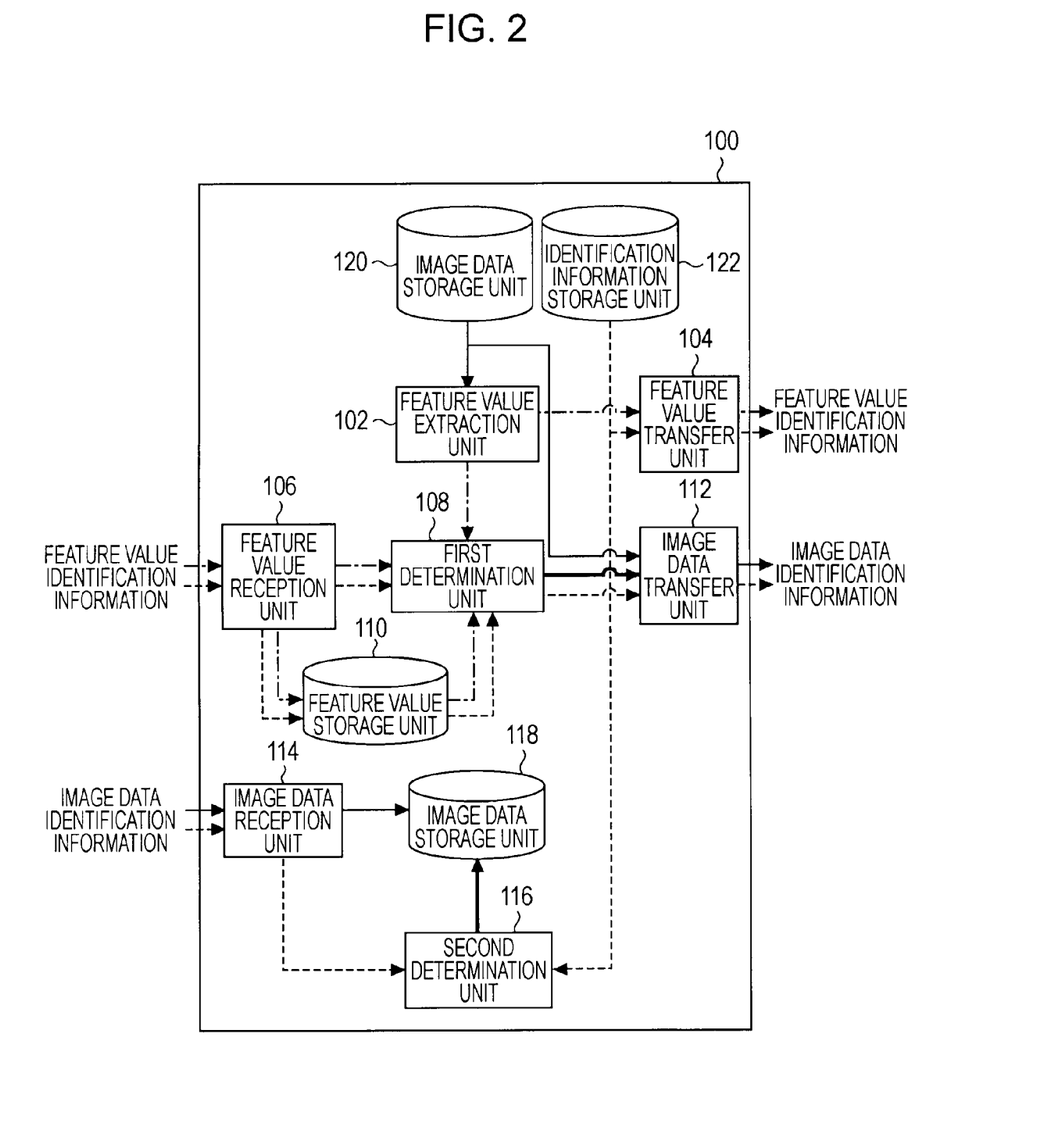
FIG. 2 is a block diagram illustrating a main functional configuration of a camera according to a first embodiment.

FIG. 2 is a block diagram illustrating a main functional configuration of a camera according to the first embodiment of the present invention.

The camera 100 according to this embodiment includes a feature value extraction unit 102, a feature value transfer unit 104, a feature value reception unit 106, a first determination unit 108, a feature value storage unit 110, an image data transfer unit 112, an image data reception unit 114, a second determination unit 116, an image data storage unit 118, an image data storage unit 120, and an identification information storage unit 122.

The feature value extraction unit 102 is a functional configuration unit for extracting a feature value from image data. The feature value transfer unit 104 is a functional configuration unit for transferring to another unspecified camera a feature value extracted from image data to be exchanged and identification information allowing identification of a camera (the camera 100) from which the extracted feature value is to be transferred. The feature value reception unit 106 is a functional configuration unit for receiving from another unspecified camera a feature value and identification information of the unspecified camera from which the feature value has been transferred. The first determination unit 108 is a functional configuration unit for determining whether the received feature value matches a feature value included in image data of a captured image. The feature value storage unit 110 is a functional configuration unit for storing a plurality of feature values received from other unspecified cameras and pieces of identification information identifying these cameras from which the feature values have been transferred.

The image data transfer unit 112 is a functional configuration unit for, when it is determined by the first determination unit 108 that there is a match between the feature value received from another unspecified camera and the feature value included in the image data of the captured image, transferring to the unspecified camera the image data of the captured image and identification information identifying the unspecified camera from which the feature value has been transferred and then been received. The image data reception unit 114 is a functional configuration unit for receiving from another unspecified camera image data of a captured image and identification information identifying a camera (the camera 100) from which a feature value included in the image data of the captured image has been transferred. The second determination unit 116 is a functional configuration unit for determining whether the received identification information matches identification information of a camera (the camera 100) that has received the identification information from another unspecified camera. The image data storage unit 118 is a functional configuration unit for, when it is determined by the second determination unit 116 that there is a match between the received identification information and the identification of the camera 100, storing the received image data of the captured image. The image data storage unit 120 is distinguished from the image data storage unit 118, and is a functional configuration unit storing image data in advance. The identification information storage unit 122 is a functional configuration unit for storing the identification information of the camera 100.

For example, each of the feature value transfer unit 104, the feature value reception unit 106, the image data transfer unit 112, and the image data reception unit 114 is composed of the communication unit 58, etc. For example, each of the first determination unit 108 and the second determination unit 116 is composed of the CPU 51, etc., and outputs a control signal to another functional configuration unit. For example, the feature value extraction unit 102 is composed of the DSP 35, the CPU 51, etc. For example, the feature value storage unit 110 is composed of the combination of the RAM 53, the storage unit 55, the memory I/F 59 and the memory card 61, etc. For example, each of the image data storage units 118 and 120 is composed of the combination of the drive 63 and the recording media 64 to 67, etc. For example, the identification information storage unit 122 is composed of the ROM 52, etc. The above-described configuration is an example only, and the configuration of the camera 100 is not limited thereto.

Figure 3:
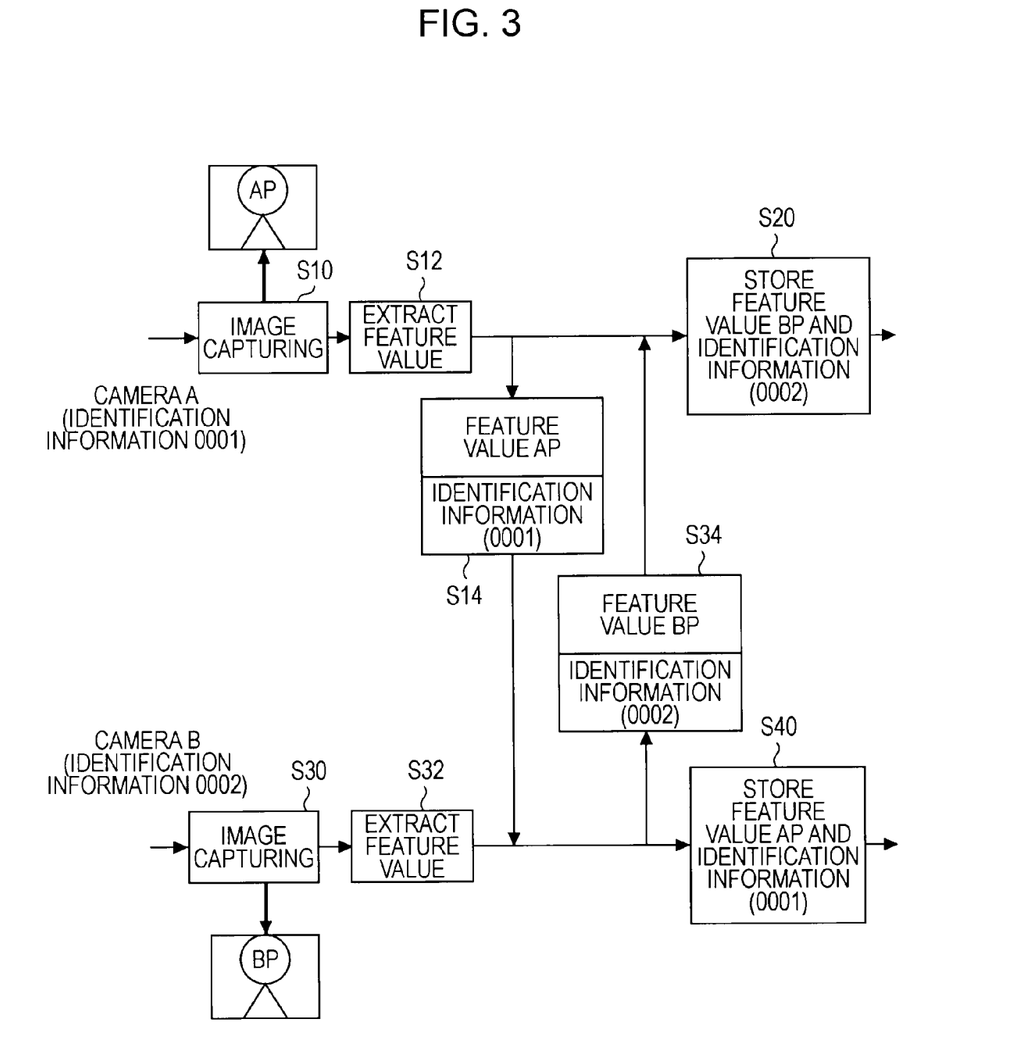
FIG. 3 is a schematic diagram describing an image data exchange method (a feature value extraction and transfer process) according to the first embodiment.
Figure 4:
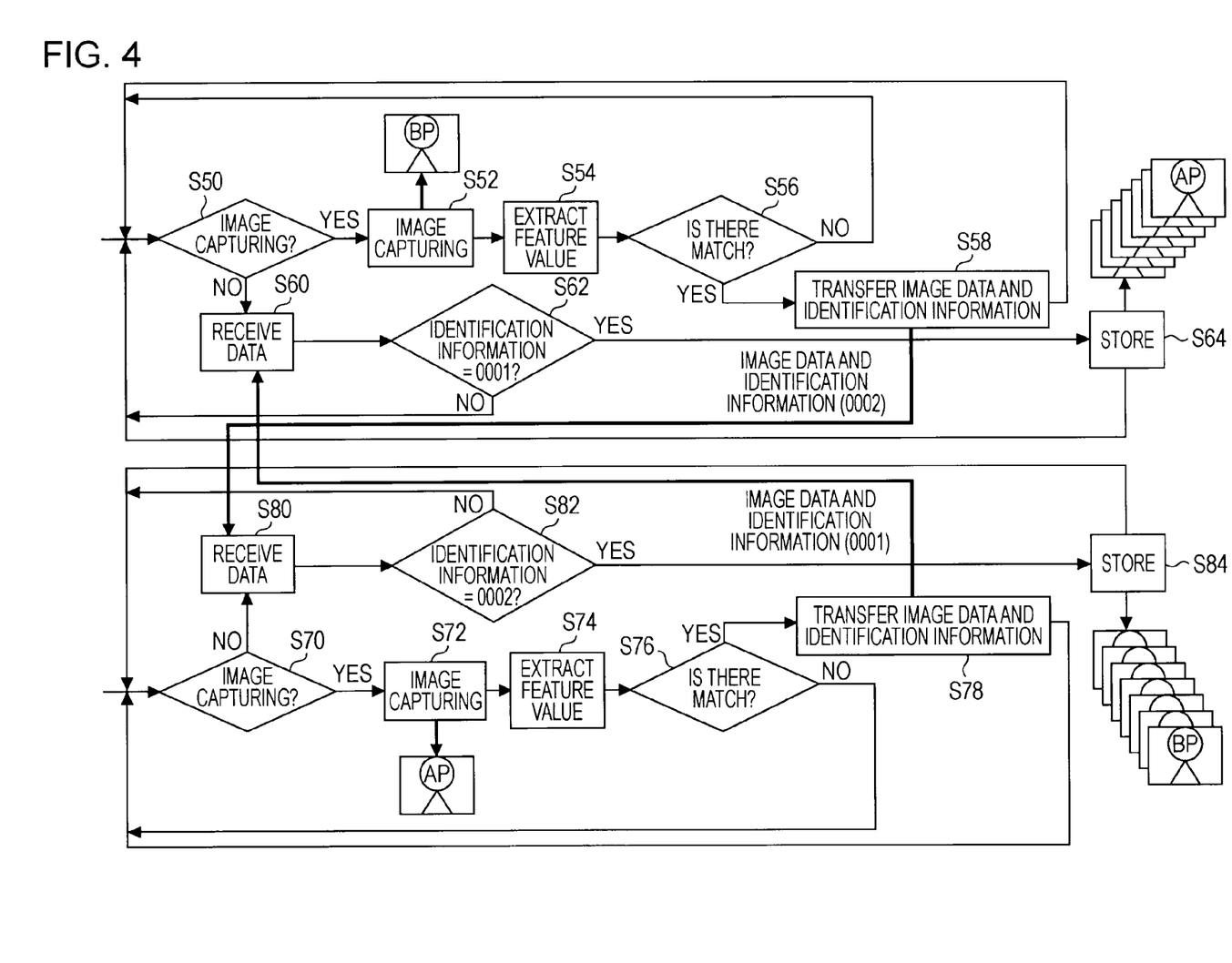
FIG. 4 is a schematic diagram describing an image data exchange method (a feature value comparison and image transfer process) according to the first embodiment.
Figure 5:
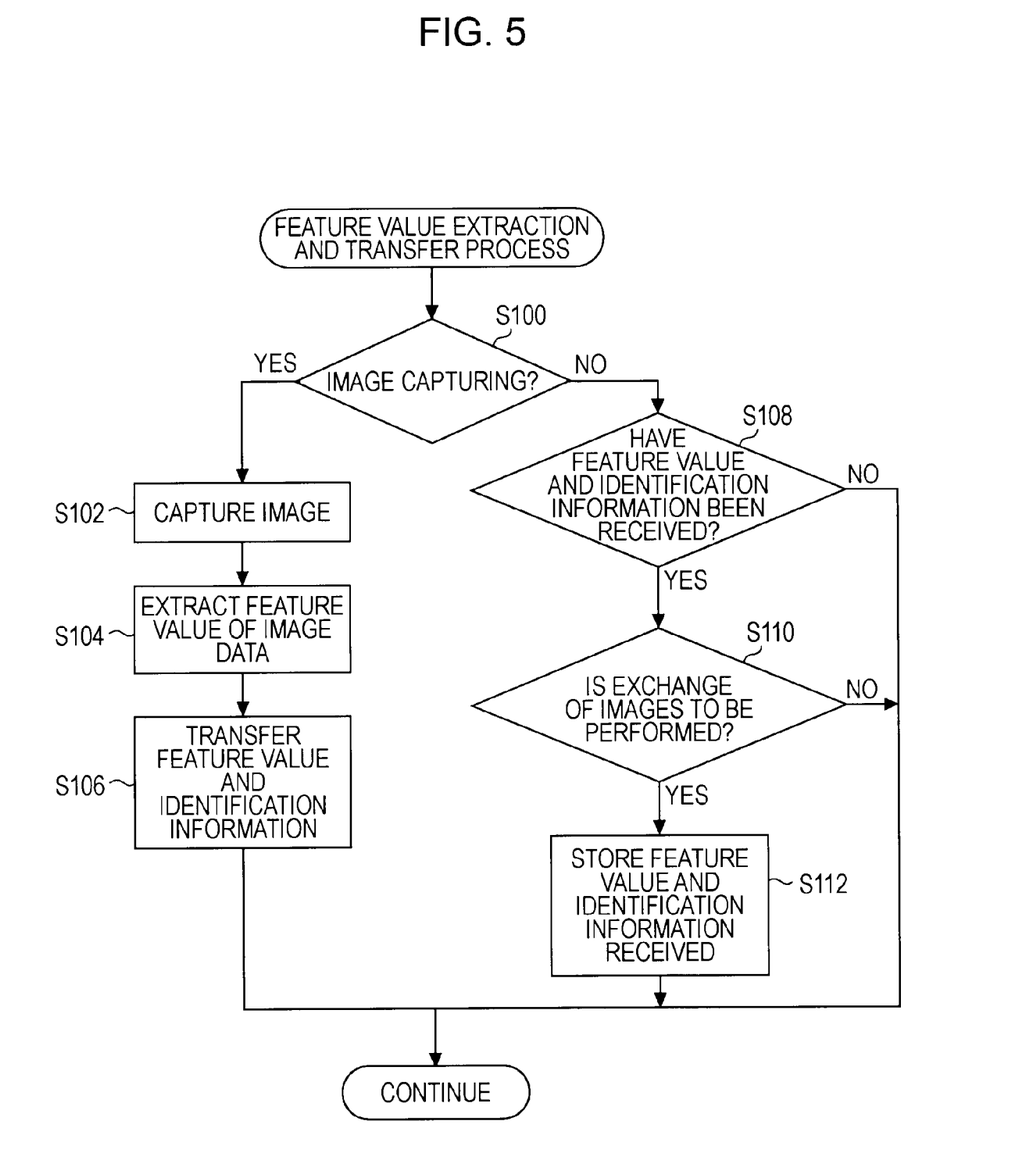
FIG. 5 is a flowchart illustrating an image data exchange method (a feature value extraction and transfer process) according to the first embodiment.
Figure 6:
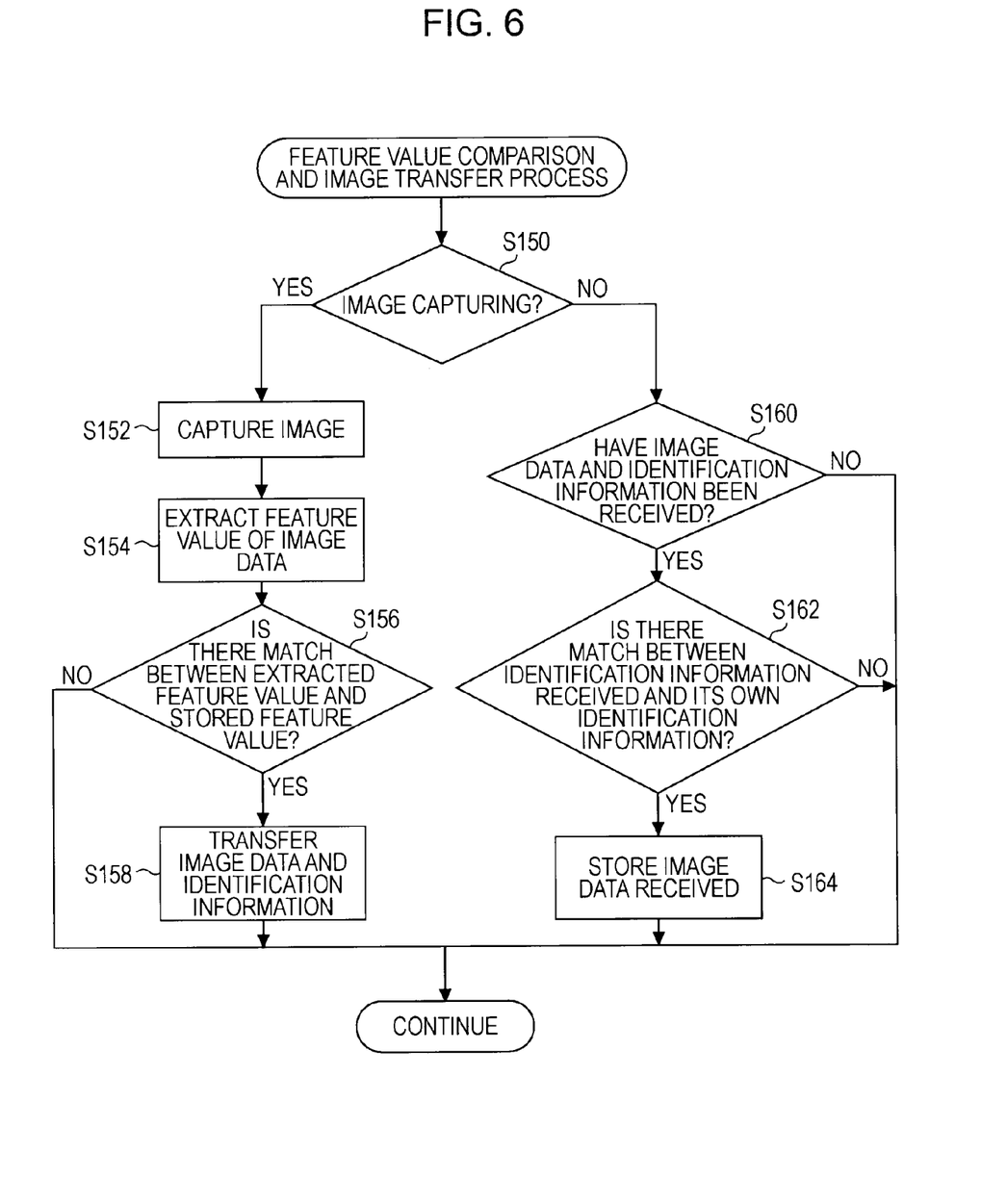
FIG. 6 is a flowchart illustrating an image data exchange method (a feature value comparison and image transfer process) according to the first embodiment.

FIGS. 3 and 4 are schematic diagrams describing an image data exchange method according to this embodiment. FIGS. 5 and 6 are flowcharts illustrating an image data exchange method according to this embodiment. FIGS. 3 and 5 illustrate a feature value extraction and transfer process. FIGS. 4 and 6 illustrate a feature value comparison and image transfer process.

First, the feature value extraction and transfer process will be described. In the feature value extraction and transfer process, a feature value included image data of a captured image is extracted, and the extracted feature value and identification information of a camera are transferred to another unspecified camera for storage.

FIG. 3 illustrates a case in which the image of a photographer AP who is an operator of a camera A is captured by the camera A, and the image of a photographer BP who is an operator of a camera B is captured by the camera B, and the image data of the captured image of the photographer AP and the image data of the captured image of the photographer BP are exchanged between the cameras A and B. Pieces of image data may be exchanged among three or more cameras. Pieces of image data of images of specific subjects other than photographers may be exchanged.

In an example illustrated in FIG. 3, first, the camera A captures the image of the photographer AP so as to specify subject image data included in image data to be transferred from one camera to another camera (step S10). Next, a feature value AP is extracted from the captured image of the subject (the photographer AP) (step S12). The feature value AP of the subject image and identification information 0001 of the camera A are transferred to unspecified cameras including the camera B (step S14). On the other hand, the camera B stores the feature value AP and the identification information 0001 which have been received from the camera A (step S40).

Here, the feature value of a subject image denotes parameter information used to identify the subject image included in an image corresponding to image data. In the following, a method of identifying a subject image on the basis of the feature value of a subject image and the face image of the subject will be briefly described. A subject image used in this embodiment is not limited to the face image of a subject, and may be an image having another feature such as color or shape of a subject. A subject may not be a person.

In order to identify a subject image on the basis of the face image of a subject, first, an image area representing the face of a subject is detected from an image corresponding to image data using a template defining an average facial feature and is then extracted as a face image. Subsequently, the correlation between the feature value of the extracted face image and the feature value of each of a plurality of face images registered in advance is examined, and one of the registered face images having the highest correlation with the extracted face image is identified as the face image of the subject. Here, for example, at the time of extracting from a face image a feature value that is effective for identification of the face image, signal processing such as edge image processing, frequency intensity image processing, high-order autocorrelation processing, or color conversion image processing is performed. For example, parameter information representing the face feature of a subject, for example, parameter information representing the eyes or nose of a subject, is extracted as the feature value of a face image.

The identification information of a camera is the manufacture's serial number of the camera or information allowing identification of a specific camera, for example, the communication address of a camera having a communication function. Other unspecified cameras are cameras existing within the wire/wireless communication range of a corresponding camera.

In the feature value extraction and transfer process, if the image capturing (step S10) is not performed, a feature value may be extracted from image data that has already been stored in the camera A and then be transferred to other unspecified cameras along with the identification information of the camera A.

In the following description, as in the camera A, in the camera B, it is assumed that the image capturing of the photographer BP (step S30), the extraction of a feature value BP from image data (step S32), and the automatic transfer of the feature value BP and identification information 0002 (step S34) are performed. On the other hand, in the camera A, it is assumed that the storage of the feature value BP and the identification information 0002 (step S20) is performed. The above-described process may be performed only in the camera A. A process similar to that performed in the camera A may not be performed in the camera B. If pieces of image data are exchanged among the cameras A and B and a camera C, a process similar to that performed in the cameras A and B may be performed in the camera C.

Next, a feature value comparison and image transfer process will be described. In the feature value comparison and image transfer process, a feature value included in image data of a captured image is automatically extracted. The extracted feature value is compared with a feature value received from another unspecified camera. If these feature values are the same, the image data and corresponding identification information are transferred to the unspecified camera. If image data and the camera's own identification information are received from another unspecified camera, the image data is stored in the camera.

FIG. 4 is a diagram illustrating the same case as that illustrated in FIG. 3 in which pieces of image data of captured images of the photographers AP and BP are exchanged between the cameras A and B.

In an example illustrated in FIG. 4, first, the camera A captures an image including a specific subject (step S52). For example, if the image of the photographer BP is captured, the feature value BP of the subject image (the image of the photographer BP) included in the captured image is automatically extracted (step S54). The extracted feature value is compared with the feature value BP of a subject image stored in advance in the feature value extraction and transfer process (step S56). If these feature values are the same, image data and the identification information 0002 that is stored in the camera A along with the feature value BP are transferred to other unspecified cameras including the camera B (step S58).

In the feature value comparison and image transfer process, if the image capturing (step S52) is not performed, the feature value of a subject image may be extracted from image data that has already been stored in the camera A and then be compared with a transferred feature value. If these feature values are the same, the image data may be transferred to other unspecified cameras along with identification information.

Furthermore, if the image capturing is not performed, it is determined whether image data has been received from another unspecified camera (step S60). If it is determined that image data has been received, identification information that has been received along with the image data is compared with the camera's own identification information 0001 (step S62). If these pieces of identification information are the same, the received image data is stored in the camera A (step S64).

The process from the extraction of a feature value from image data (step S54) to the transfer of image data and identification information (step S58) and the process from the reception of image data (step S60) to the storage of the image data (step S64) are automatically performed without a user's operation.

As in the camera A, in the camera B, the image capturing of the photographer AP (step S72), the automatic extraction of the feature value AP from image data (step S74), the automatic comparison between feature values (step S76), the automatic transfer of image data and identification information 0001 (step S78), the automatic reception of image data and identification information (step S80), the automatic comparison between pieces of identification information (step S82), and the automatic storage of image data (step S84) are performed. If pieces of image data are exchanged among the cameras A, B and C, a process similar to that performed in the cameras A and B may be performed in the camera C.

Consequently, between the cameras A and B, or among the cameras A, B, and C, image data of an image including the photographer AP is automatically stored in the camera A that wants to obtain the image data, and image data of an image including the photographer BP is automatically stored in the camera B that wants to obtain the image data.

FIG. 5 illustrates the feature value extraction and transfer process performed in a specific camera in detail.

In the feature value extraction and transfer process, first, it is determined whether image capturing is performed (step S100). If the image capturing is performed, an image including a specific subject is captured (step S102). Subsequently, if a desired subject image is included in the captured image, the feature value of the subject image is extracted from image data by a user's operation (step S104). If the extracted feature value of the subject image is transferred to other unspecified cameras, the feature value of the subject image and the camera's own identification information allowing the identification of the camera are transferred by a user's operation (step S106). Here, for example, pieces of relevant information about image capturing conditions and the user of the camera may be transferred along with the camera's own identification information.

On the other hand, if the image capturing is not performed, it is determined whether a feature value and identification information have been received from another unspecified camera (step S108). If a feature value and identification information have been received, it is determined by a user's operation whether requested exchange processing is performed on the basis of the identification information of a camera and relevant information (step S110) If the exchange processing is performed, the received feature value of a subject image which is included in image data to be exchanged and the identification information of a camera from which the feature value has been transferred are stored (step S112). On the other hand, if the exchange processing is not performed, the received pieces of information are deleted without being stored.

If the feature value and the identification information have not been received, if the requested exchange processing is not performed, or if the received feature value and the received identification information are stored, the process returns to the determination of whether image capturing is performed (step S100) so as to continue the feature value extraction and transfer process unless other processes including the feature value comparison and image transfer process are requested.

FIG. 6 illustrates the feature value comparison and image transfer process performed in a specific camera in detail.

In the feature value comparison and image transfer process, first, it is determined whether image capturing is performed (step S150). If the image capturing is performed, an image including a specific subject is captured (step S152). Subsequently, the feature value of a subject image is extracted from image data (step S154). The extracted feature value is compared with a feature value of a subject image included in image data to be exchanged which has been received from another unspecified camera and then been stored (step S156). If these feature values are the same, image data and identification information that has been stored along with the feature value are transferred to other unspecified cameras (step S158). On the other hand, if these feature values are not the same, the image data is stored without being transferred in the same manner as in the case of normal image capturing. If these feature values are not the same, or if the image data and the identification information have been transferred, the process returns to the determination of whether image capturing is performed (step S150) so as to continue the feature value comparison and image transfer process.

On the other hand, if it is determined (in step S150) that image capturing is not performed, it is determined whether image data and identification information have been received from another unspecified camera (step S160). If image data and identification information have been received, the received identification information is compared with the camera's own identification information (step S162). If these pieces of identification information are the same, the received image data is stored (step S164). On the other hand, if these pieces of identification information are not the same, the received image data is deleted without being stored. If image data has not been received, or if these pieces of identification information are not the same, the process returns to the determination of whether image capturing is performed (step S150) so as to continue the feature value comparison and image transfer process.

In the examples illustrated in FIGS. 3 and 4, the camera A specifies the feature value AP of the image of the photographer AP, and the camera B specifies the feature value BP of the image of the photographer BP. Thus, each camera specifies a single feature value. However, each camera may specify a plurality of feature values.

Figure 7:
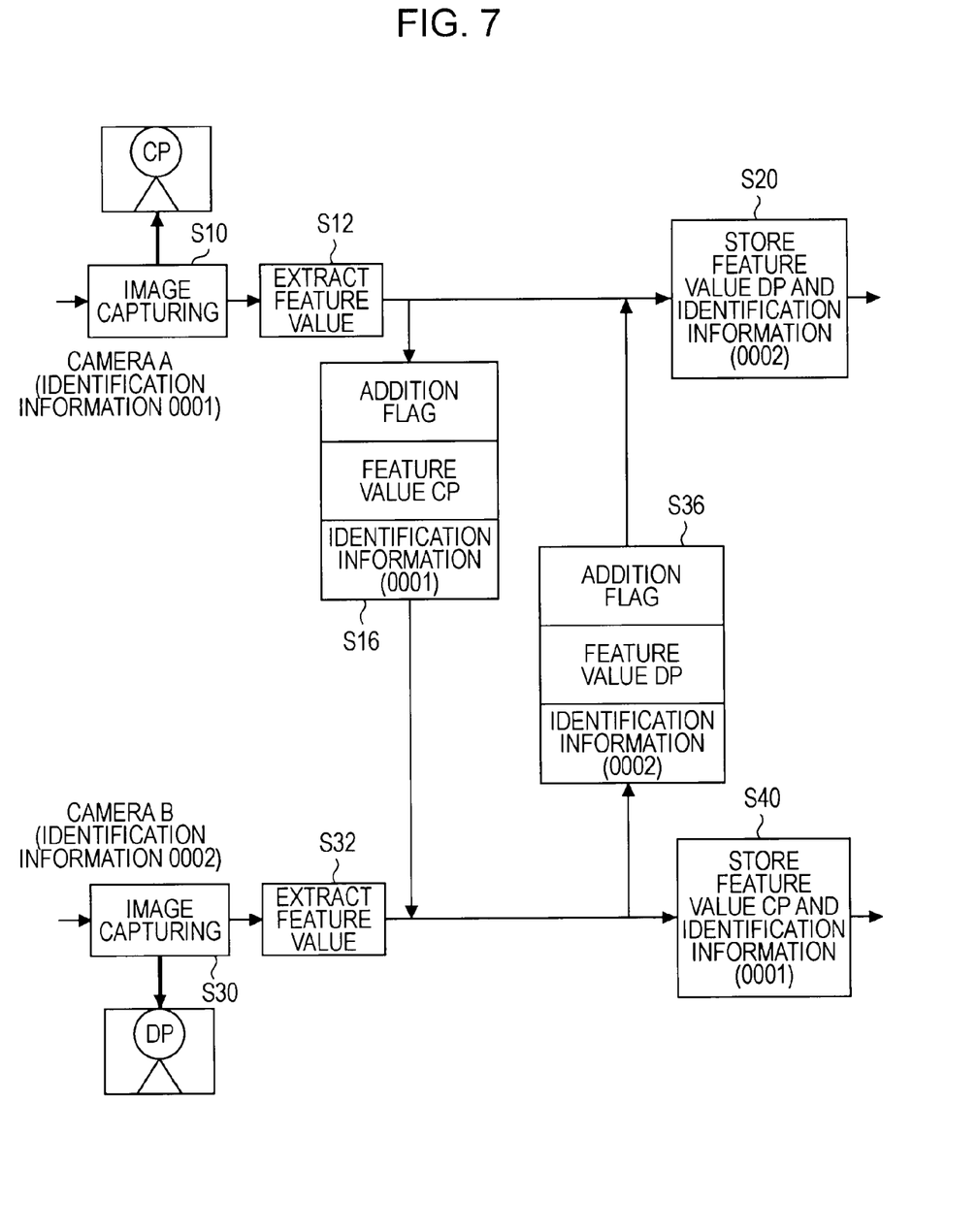
FIG. 7 is a schematic diagram describing a feature value extraction and transfer process performed when a plurality of feature values are specified.

FIG. 7 is a schematic diagram illustrating a feature value extraction and transfer process performed when a plurality of feature values are specified. The feature value extraction and transfer process illustrated in FIG. 7 is performed subsequent to the feature value extraction and transfer process illustrated in FIG. 3.

In an example illustrated in FIG. 7, after transferring the feature value AP of the image of the photographer AP, the camera A captures the image of a subject CP so as to specify an additional subject image (step S10). Subsequently, a feature value CP of the subject image is extracted from the image data of the subject CP (step S12). The feature value CP of the subject image is transferred to other unspecified cameras including the camera B along with the identification information 0001 of the camera A and an addition flag (step S16). The camera B stores the feature value CP and the identification information 0001 which have been received from the camera A (step S40). In the camera B, a process similar to that performed in the camera A may be performed.

Since the feature value CP and the addition flag are transferred, the camera B stores the feature value CP in addition to the feature value AP of the image of the photographer AP that has already been stored. As a result, pieces of image data corresponding to a plurality of subject images (the images of the photographers AP and BP) can be automatically exchanged between the cameras A and B in accordance with the feature values and the identification information which have been received. Instead of adding the feature value of a different subject, the feature value of the same subject may be added. As a result, for example, image data to be exchanged can be exchanged in accordance with the feature values of subject images that have been captured from various angles.

If the feature value AP of the subject image which has already been transferred to other unspecified cameras is updated, an update flag may be used instead of the addition flag. The update flag is transferred along with information (for example, AP) specifying the feature value that has not been updated yet. For example, if the feature value AP of the image of the photographer AP is updated, the image of the photographer AP is recaptured so as to extract a feature value AP' from image data. The feature value AP' is transferred to other unspecified cameras including the camera B along with the identification information of the camera A and the update flag.

Accordingly, since the feature value AP' is transferred along with the update flag, the camera B exchanges image data on the basis of the updated feature value AP' instead of the feature value AP of the image of the photographer AP which has already been stored. Accordingly, by updating a feature value, the accuracy of comparing the feature values of subject images can be improved.

As described previously, according to an image data exchange method according to this embodiment, on the basis of the feature value of a subject image included in image data to be exchanged, corresponding image data is automatically transferred to/from another unspecified camera. Accordingly, a plurality of cameras can efficiently exchange pieces of image data to be exchanged with each other. Furthermore, corresponding image data is automatically transferred to/from another unspecified camera along with the identification of a camera that wants to obtain the image data. Accordingly, a plurality of cameras can efficiently exchange pieces of image data to be exchanged with each other in accordance with the determination result of the identification information. At the time of exchanging pieces of image data, there are no operational burdens on users, for example, the determination of image data, an operation for establishing a connection, and the deletion of image data. Furthermore, the electric power for the operation of a camera can be prevented from being wasted due to an inefficient user's operation such as an operation for establishing a connection for each piece of image data or the transfer or deletion of unnecessary image data. Consequently, even in a case in which it is necessary to obtain image data of a captured image of a specific subject, a plurality of cameras can efficiently exchange pieces of image data with each other.

Second Embodiment

An image data exchange method according to the second embodiment of the present invention will be described while avoiding repetition of the description that has already been made in an image data exchange method according to the first embodiment.

Figure 8:
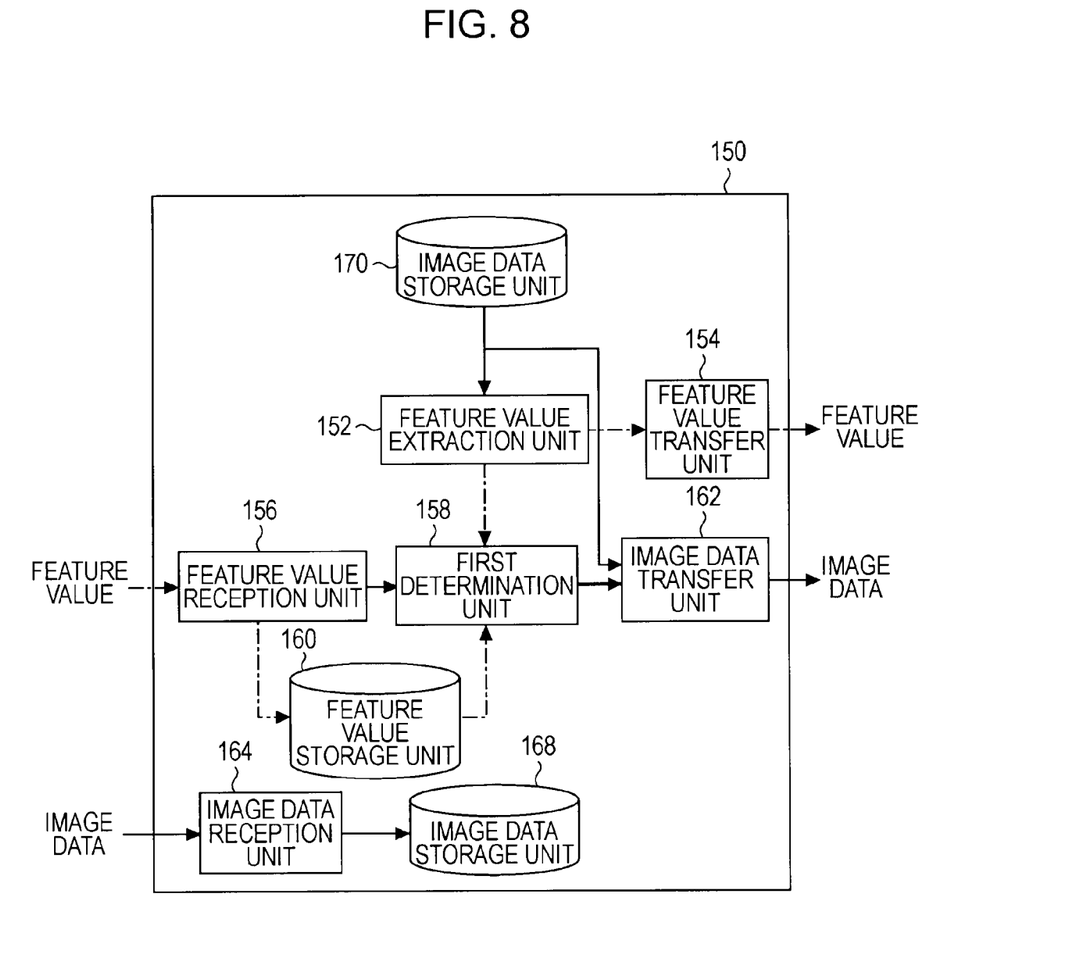
FIG. 8 is a block diagram illustrating a main functional configuration of a camera according to a second embodiment.

FIG. 8 is a block diagram illustrating a main functional configuration of a camera according to the second embodiment of the present invention. A camera 150 according to this embodiment includes a feature value extraction unit 152, a feature value transfer unit 154, a feature value reception unit 156, a first determination unit 158, a feature value storage unit 160, an image data transfer unit 162, an image data reception unit 164, and image data storage units 168 and 170.

The feature value transfer unit 154 is a functional configuration unit for transferring to another unspecified camera a feature value extracted from image data to be exchanged. The feature value reception unit 156 is a functional configuration unit for receiving from another unspecified camera a feature value. The first determination unit 158 is a functional configuration unit for determining whether the received feature value matches a feature value included in image data of a captured image. The image data transfer unit 162 is a functional configuration unit for transferring image data to another unspecified camera when the feature values are the same. The feature value storage unit 160 is a functional configuration unit for storing a plurality of feature values received from other unspecified cameras.

The image data reception unit 164 is a functional configuration unit for receiving image data of a captured image transferred from another unspecified camera. The image data storage unit 168 is a functional configuration unit for storing the received image data of the captured image.

Figure 9:
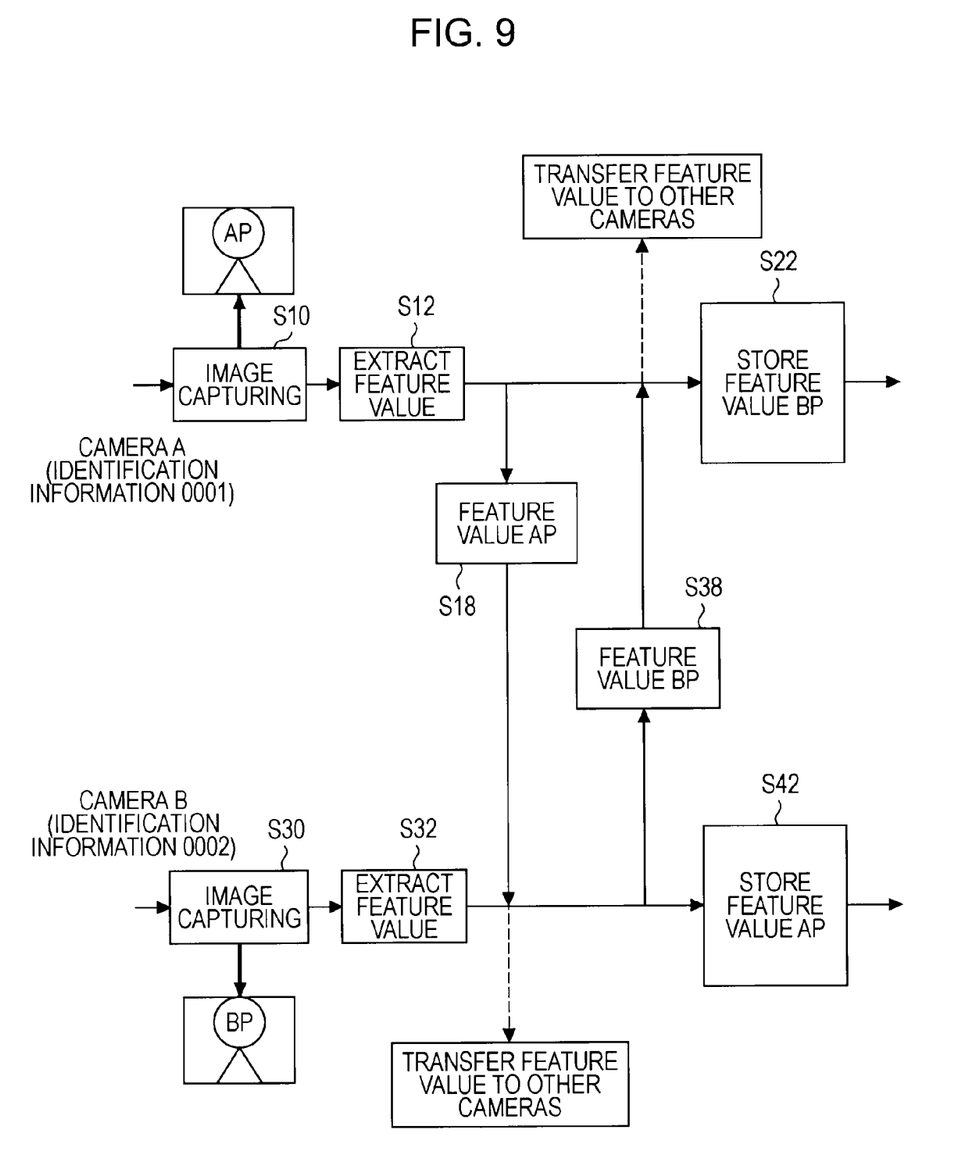
FIG. 9 is a schematic diagram describing a feature value extraction and transfer process performed in an image data exchange method according to the second embodiment.

FIG. 9 is a schematic diagram describing a feature value extraction and transfer process performed in an image data exchange method according to this embodiment.

In a feature value extraction and transfer process according to this embodiment, a feature value is extracted from image data of a captured image, and the extracted feature value is transferred to another unspecified camera for storage. Accordingly, unlike a feature value extraction and transfer process according to the first embodiment, the identification information of a camera from which the feature value is to be transferred is not transferred. For example, instead of transferring no identification information of a camera, identification information with which no specific camera can be identified, for example, a number assigned to no cameras, may be transferred.

In an example illustrated in FIG. 9, first, the camera A captures the image of the photographer AP so as to specify a subject image included in image data to be exchanged (step S10). Next, the feature value AP of the subject image (the image of the photographer AP) is extracted from the image data of the captured image of the photographer AP (step S12). The feature value AP of the subject image is transferred to other unspecified cameras including the camera B (step S18). On the other hand, the camera B stores the feature value AP that has been received from the camera A (step S42). Accordingly, the identification information 0001 of the camera A is not transferred to other unspecified cameras including the camera B, and is not stored in the unspecified cameras including the camera B.

In the following description, as in the camera A, in the camera B, it is assumed that the image capturing of the photographer BP (step S30), the automatic extraction of the feature value BP from image data (step S32), and the automatic transfer of the feature value BP (step S38) are performed. On the other hand, in the camera A, it is assumed that the storage of the feature value BP (step S22) is performed. The above-described process may be performed only in the camera A. A process similar to that performed in the camera A may not be performed in the camera B. If pieces of image data are exchanged among the cameras A, B and C, a process similar to that performed in the cameras A and B may be performed in the camera C.

Next, a feature value comparison and image transfer process according to this embodiment will be described. As in a feature value comparison and image transfer process according to the first embodiment, in a feature value comparison and image transfer process according to this embodiment, the image capturing of a subject, the automatic extraction of a feature value from image data, the automatic comparison between feature values, the automatic transfer of image data and identification information, the automatic reception of image data and identification information, the automatic comparison between pieces of identification information, and the automatic storage of image data are performed.

In a feature value extraction and transfer process according to this embodiment, however, at the time of transferring the feature value of a subject image included in image data to be exchanged, the identification information of a camera from which the feature value is to be transferred is not transferred along with the feature value. Accordingly, an extracted feature value is compared with a feature value that has been received from another unspecified camera. If these feature values are the same, only image data is transferred to other unspecified cameras without the identification information of the unspecified camera from which the feature value has been transferred. If image data is received from another unspecified camera, identification information is not received along with the image data. Since the comparison between pieces of identification information is not performed (or it is difficult to identify a camera from which the image data has been transferred), the image data received from the unspecified camera is stored regardless of a camera from which the image data has been transferred.

Consequently, between the cameras A and B, or among the cameras A, B, and C, image data of an image including the photographer AP is automatically stored in the camera A that wants to obtain the image data or in the cameras A and C, and image data of an image including the photographer BP is automatically stored in the camera B that wants to obtain the image data or in the cameras B and C.

As in an image data exchange method according to the first embodiment, in an image data exchange method according to this embodiment, each camera may specify a plurality of feature values. As a result, among a plurality of cameras, pieces of image data to be exchanged corresponding to a plurality of images each including a subject image can be automatically exchanged.

As described previously, according to an image data exchange method according to this embodiment, on the basis of the feature value of a subject image included in image data to be exchanged, corresponding image data is automatically transferred to/from other unspecified cameras. Accordingly, a plurality of cameras can efficiently exchange pieces of image data to be exchanged with each other. Consequently, even in a case in which it is necessary to obtain image data of a captured image of a specific subject, a plurality of cameras can efficiently exchange pieces of image data with each other.

Although the preferred embodiments of the present invention have been described above with reference to the accompanying drawings, the present invention is not limited thereto. It is obvious that various changes and modifications of the embodiments can be made by those skilled in the art without departing from the spirit and scope of the present invention. Accordingly, it should be understood that these changes and modifications fall within the scope of the present invention.

For example, a camera is used above to describe an image processing apparatus and an image processing method according to an embodiment of the present invention. However, the present invention can be applied to, for example, a video camera or various types of mobile terminals capable of capturing a still image. Furthermore, pieces of image data may be exchanged between different types of apparatuses, for example, between a camera and a video camera or among a camera and various types of mobile terminals.

What is claimed is:

1. An image processing apparatus for exchanging image data, comprising:
    a feature value extraction unit configured to extract a first feature value included in image data of a first captured image captured by the image processing apparatus;
    a feature value reception unit configured to receive a second feature value from an other image processing apparatus and to receive identification information of the other image processing apparatus from the other image processing apparatus;
    a first determination unit configured to determine whether the received second feature value matches the first feature value included in the image data of the first captured image and to determine when the image processing apparatus captures the first captured image; and
    an image data transfer unit configured to transfer the image data of the first captured image and the identification information of the other image processing apparatus to the other image processing apparatus in response to a determination by the first determination unit that the image processing apparatus has captured the first captured image and there being a match between the first feature value extracted by the feature value extraction unit and the second feature value.

2. The image processing apparatus according to claim 1, further comprising:
    a second determination unit; and
    a feature value transfer unit that transfers identification information allowing an identification of the image processing apparatus along with a third feature value,
    wherein the feature value reception unit receives the identification information of the other image processing apparatus along with the second feature value,
    when the first determination unit determines that there is the match between the first and second feature values, the image data transfer unit transfers to the other image processing apparatus the identification information of the other image processing apparatus along with the image data of the first captured image,
    an image data reception unit receives from the other image processing apparatus identification information along with image data of a second captured image, and
    the second determination unit determines whether the identification information received along with the image data of the second captured image from the other image processing apparatus matches the identification information allowing the identification of the image processing apparatus.

3. The image processing apparatus according to claim 1, further comprising:
    an image data reception unit configured to receive image data of a second captured image; and
    an image data storage unit configured to store the received image data of the second captured image.

4. The image processing apparatus according to claim 2, further comprising:
    an image data storage unit configured to store the received image data of the second captured image when the second determination unit determines that there is a match between the identification information received along with the image data of the second captured image from the other image processing apparatus and the identification information allowing the identification of the image processing apparatus.

5. The image processing apparatus according to claim 1, further comprising:
    a feature value storage unit configured to store a plurality of feature values received from the other image processing apparatus, wherein the first determination unit determines whether the first feature value included in the image data of the first captured image matches one of the plurality of stored feature values, and the image data transfer unit transfers to the other image processing apparatus the image data of the first captured image when there is a match among the first feature value and the one of the plurality of stored feature values.

6. The image processing apparatus according to claim 2, further comprising:
- a feature value storage unit configured to store a plurality of feature values received from the other image processing apparatus and the identification information of the other image processing apparatus, wherein the first determination unit determines whether the first feature value included in the image data of the first captured image matches one of the plurality of stored feature values, and,
- when there is a match among the first feature value and the one of the plurality of stored feature values, the image data transfer unit transfers to the other image processing apparatus the identification information of the other image processing apparatus along with the image data of the first captured image.

7. The image processing apparatus according to claim 1, wherein the feature value extraction unit extracts a feature value of a subject face image included in the image data of the first captured image, and the first determination unit determines whether the extracted feature value of the subject face image matches a feature value of a subject face image received from the other image processing apparatus.

8. An image processing method for exchanging image data, comprising:
- extracting a first feature value included in image data of a first captured image captured by a first image processing apparatus;
- receiving a second feature value and identification information of an other image processing apparatus from the other image processing apparatus;
- determining whether the extracted first feature value matches the received second feature value;
- determining that the first image processing apparatus has captured the first captured image; and
- transferring the image data of the first captured image and the identification information of the other image processing apparatus to the other image processing apparatus in response to the determining that the first image processing apparatus has captured the first captured image and there being a match between the first feature value extracted in the extracting and the second feature value.

9. The image processing method according to claim 8, wherein the identification information is received along with the second feature value, and,
- in the transferring, the identification information of the other image processing apparatus is transferred to the other image processing apparatus along with the image data of the first captured image.

10. A non-transitory computer-readable storage medium encoded with instructions, which when executed by a processor of an apparatus, cause the processor to perform a method comprising:
- extracting a first feature value included in image data of a first captured image captured by the apparatus;
- receiving a second feature value and identification information of an other apparatus from the other apparatus;
- determining whether the received second feature value matches the first feature value;
- determining that the apparatus has captured the first captured image; and
- transferring the image data of the first captured image and the identification information of the other apparatus in response to the determining that the apparatus has captured the first captured image and there being a match between the first feature value extracted in the extracting and the second feature value.

11. An image processing apparatus for exchanging image data, comprising:
- a feature value extraction unit configured to extract a first feature value included in image data of a first captured image captured by the image processing apparatus;
- a feature value reception unit configured to receive a second feature value from an other image processing apparatus and to receive a third feature value along with an addition flag and identification information of the other image processing apparatus from the other image processing apparatus;
- a first determination unit configured to determine whether the received second feature value matches the first feature value included in the image data of the first captured image, to determine, based on the addition flag, whether the received third feature value matches the first feature value included in the image data of the first captured image, and to determine when the image processing apparatus captures the first captured image; and
- an image data transfer unit configured to transfer the image data of the first captured image and the identification information of the other image processing apparatus to the other image processing apparatus in response to a determination by the first determination unit that the image processing apparatus has captured the first captured image and there being at least one match between the first feature value extracted by the feature value extraction unit and the second feature value and between the first feature value extracted by the feature value extraction unit and the third feature value.

12. The image processing apparatus according to claim 11, wherein the second feature value and the third feature value are of a same subject image captured from various angles.

13. An image processing apparatus for exchanging image data, comprising:
- a feature value extraction unit configured to extract a first feature value included in image data of a first captured image captured by the image processing apparatus;
- a feature value reception unit configured to receive a second feature value and identification information of an other image processing apparatus from the other image processing apparatus and to receive a third feature value along with an update flag and a specifier from the other image processing apparatus;
- a first determination unit configured to determine whether the received third feature value matches the first feature value included in the image data of the first captured image and to determine when the image processing apparatus captures the first captured image; and
- an image data transfer unit configured to transfer, based on the specifier specifying the second feature value, the image data of the first captured image and the identification information of the other image processing apparatus to the other image processing apparatus in response to a determination that the image processing apparatus has captured the first captured image and there being a match between the first feature value extracted by the feature value extraction unit and the third feature value instead of there being a match between the first and second feature values.

14. The image processing apparatus according to claim 13, wherein the identification information of the other image processing apparatus is received along with the second feature value and with the third feature value.

\* \* \* \* \*